United States Patent
Chen et al.

(10) Patent No.: US 11,317,033 B2
(45) Date of Patent: Apr. 26, 2022

(54) ADAPTIVE FILTER SYSTEM FOR SELF-DRIVING VEHICLE

(71) Applicant: Pony AI Inc., Grand Cayman (KY)

(72) Inventors: Kai Chen, San Jose, CA (US); Jun Peng, Fremont, CA (US); Tiancheng Lou, Milpitas, CA (US); Xiang Yu, Santa Clara, CA (US); Zhuo Zhang, Fremont, CA (US); Hao Song, Sunnyvale, CA (US); Sinan Xiao, Fremont, CA (US); Yiming Liu, San Jose, CA (US); Tianyi Li, San Jose, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 16/928,328

(22) Filed: Jul. 14, 2020

(65) Prior Publication Data

US 2020/0344397 A1 Oct. 29, 2020

Related U.S. Application Data

(63) Continuation of application No. 15/917,444, filed on Mar. 9, 2018, now Pat. No. 10,757,340.

(51) Int. Cl.

| | |
|---|---|
| *H04N 5/235* | (2006.01) |
| *G02B 27/00* | (2006.01) |
| *G03B 11/00* | (2021.01) |
| *H04N 5/238* | (2006.01) |
| *G02B 5/20* | (2006.01) |
| *G02B 7/00* | (2021.01) |
| *G05D 1/02* | (2020.01) |

(52) U.S. Cl.
CPC ....... *H04N 5/2353* (2013.01); *G02B 27/0006* (2013.01); *G03B 11/00* (2013.01); *H04N 5/238* (2013.01); *G02B 5/205* (2013.01); *G02B 7/006* (2013.01); *G05D 1/0246* (2013.01); *G05D 2201/0213* (2013.01)

(58) Field of Classification Search
CPC .. H04N 5/2353; H04N 5/238; G02B 27/0006; G02B 5/205; G02B 7/006; G03B 11/00; G05D 1/0246; G05D 2201/0213
See application file for complete search history.

(56) References Cited

U.S. PATENT DOCUMENTS

| | | | |
|---|---|---|---|
| 4,794,418 | A | 12/1988 | Kabayashi |
| 5,347,330 | A | 9/1994 | Hofeldt |
| 7,158,866 | B2 | 1/2007 | Gustafsson et al. |
| 8,125,545 | B2 | 2/2012 | Hablutzel |
| 2003/0160184 | A1 | 8/2003 | Curry |
| 2007/0138154 | A1 | 6/2007 | Seong |

(Continued)

FOREIGN PATENT DOCUMENTS

| | | |
|---|---|---|
| CN | 101078853 A | 3/2003 |
| JP | 2003092704 A | 11/2007 |

*Primary Examiner* — Antoinette T Spinks
(74) *Attorney, Agent, or Firm* — Sheppard Mullin Richter & Hampton LLP

(57) ABSTRACT

An adaptive filter system and a method for controlling the adaptive filter system are described herein. The system can includes one or more filters to attenuate incoming light. The one or more filters can be moved by one or more actuators. The method can capture image data from an imaging device through the one or more filters. Information can be determined from the captured image data. The one or more filters can be moved to a position for capturing image data based on the information.

14 Claims, 10 Drawing Sheets

(56) References Cited

U.S. PATENT DOCUMENTS

| | | |
|---|---|---|
| 2007/0229979 A1 | 10/2007 | Nurishi |
| 2007/0273858 A1 | 11/2007 | Nagasaka |
| 2008/0046207 A1 | 2/2008 | Baillet |
| 2008/0055599 A1 | 3/2008 | Baillet |
| 2008/0297647 A1 | 12/2008 | Okabe |
| 2013/0070054 A1 | 3/2013 | Takaya |
| 2016/0057332 A1 | 2/2016 | Ciurea |
| 2018/0014726 A1 | 1/2018 | Maughan |
| 2018/0154723 A1 | 6/2018 | Anderson et al. |
| 2019/0346774 A1 | 11/2019 | Maeda |

ADAPTIVE FILTER SYSTEM FOR SELF-DRIVING VEHICLE

CROSS-REFERENCE TO RELATED APPLICATION

This application is a continuation of U.S. application Ser. No. 15/917,444, filed Mar. 9, 2018, the content of which is incorporated in its entirety.

BACKGROUND

Self-driving vehicles, assisted-driving vehicles, or autonomous vehicles, generally refer to a category of vehicles that can be operated with limited or no human inputs. These vehicles rely primarily on collecting road information (e.g., objects, traffic lights, traffic signs, lighting conditions, weather and road conditions, etc.) gathered from various sensors and/or devices (e.g., visible and infrared cameras, light detection and ranging sensors (LiDAR), global positioning systems (GPS), etc.) to make driving decisions (e.g., accelerate, brake, turn right or left, etc.). In particular, self-driving vehicles depend substantially on visual information based on images captured from imaging devices, such as cameras, to make driving decisions. In order for self-driving vehicles to accurately process road information, images captured by imaging devices must have proper exposure. Images that are over exposed or under exposed require further processing and require additional processing overhead, which could potentially delay decisions to be taken by the self-driving vehicles. Therefore, for self-driving vehicles to operate as intended, it is critical that images captured from imaging devices have proper exposure.

These and other issues are addressed, resolved, and/or reduced using the systems, methods, and technique described herein.

SUMMARY

An adaptive filter system for a self-driving vehicle is described herein. The adaptive filter system can includes one or more filters to attenuate incoming light. The one or more filters can be coupled to one or more actuators and can be moved by the one or more actuators in response to the attenuated incoming light.

In some embodiments, the adaptive filter system can include an imaging device to capture the attenuated incoming light through the one or more filters. The imaging device can be disposed at the position for capturing images. In some embodiments, the adaptive filter system can include an ambient sensor to detect ambient light, wherein the ambient sensor is coupled to the imaging device. In some embodiments, the adaptive system can include a housing to clean the one or more filters.

In some embodiments, the one or more filters can be a graduated neutral density filter. The graduated neutral density filter can vary its optical density along an axis. The one or more actuators can be an actuator that moves rotationally, radially, or both.

In some embodiments, a controller can be configured to move the graduated neutral density filter along the axis to a position optimal for capturing images. The graduated neutral density filter can have a particular range of optical densities at the position optimal for capturing images.

In some embodiments, the one or more filters can be a plurality of neutral density filters concentrically arranged around a center. The plurality of neutral density filters can include at least a first neutral density filter having a first optical density and a second neutral density filter having a second optical density. The second optical density of the second neutral density filter can be greater than the first optical density of the first neutral density filter. The one or more actuators can be an actuator that moves rotationally.

In some embodiments, the one or more filters can be a plurality of neutral density filters arranged serially along an axis. The plurality of neutral density filters can include at least a first neutral density filter having a first optical density and a second neutral density filter having a second optical density. The second optical density of the second neutral density filter can be greater than the first optical density of the first neutral density filter. The one or more actuators can be a series of actuators that move rotationally, wherein the series of actuators are integrated within the housing.

In some embodiments, a controller can be configured to switch in a neutral density filter from the plurality of neutral density filters to the position for capturing images. The neutral density filter can have a particular optical density.

In some embodiments, the plurality of neutral density filters can include at least a third neutral density filter having a third optical value. The third optical density of the third neutral density filter can be greater than the second optical density of the second neutral density filter.

In some embodiments, the controller can control the one or more actuators based at least on image data generated by the imaging device.

In some embodiments, the controller can control the one or more actuators based at least on ambient light data generated by the ambient light sensor.

It should be appreciated that many other features, applications, embodiments, and/or variations of the disclosed technology will be apparent from the accompanying drawings and from the following detailed description. Additional and/or alternative implementations of the structures, systems, and methods described herein can be employed without departing from the principles of the disclosed technology.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

Figure 1:
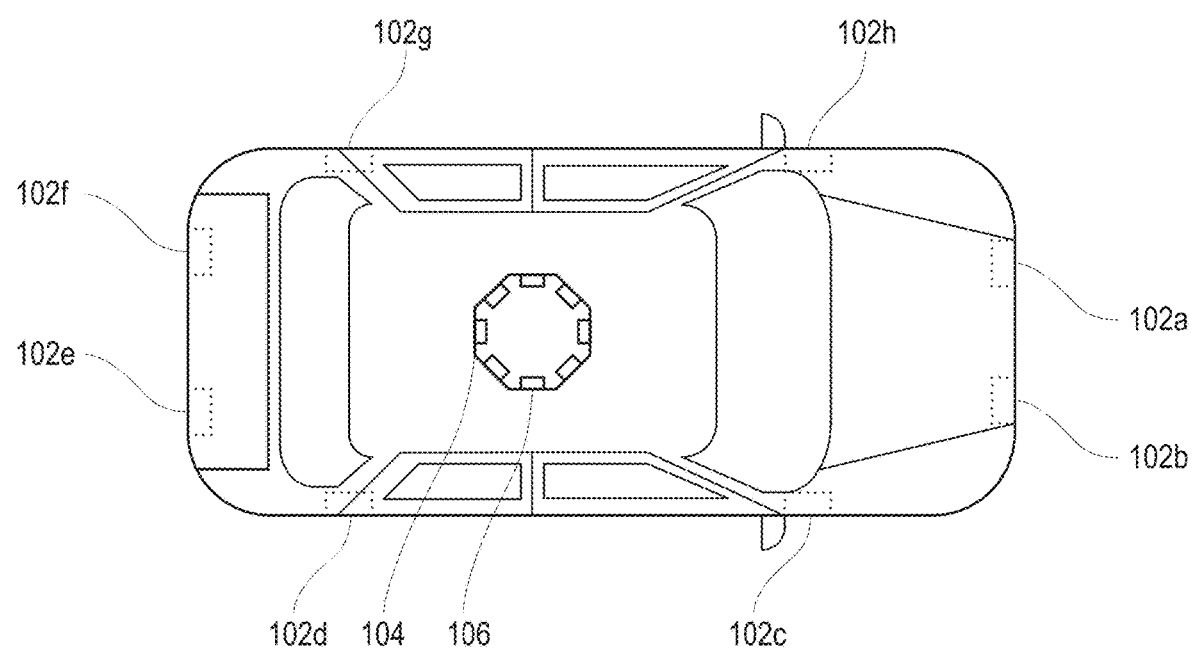
FIG. 1 depicts an example self-driving vehicle according to an embodiment of the current disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment," "an embodiment," "some embodiments," or "various embodiments" means that a particular feature, structure or characteristic described in connection with the embodiment is included in at least one embodiment of the present invention. Thus, the appearances of the phrases "in one embodiment," "in an embodiment," "in some embodiments," or "in various embodiments" in various places throughout this specification are not necessarily all referring to the same embodiment, but may be in some instances. Furthermore, the particular features, structures, or characteristics may be combined in any suitable manner in one or more embodiments.

As previously discussed, self-driving vehicles primarily rely on sensors and/or devices (e.g., visible and infrared cameras, light detection and ranging sensors (LiDAR), global positioning systems (GPS), etc.) to collect road information (e.g., objects, traffic lights, road signs, time of day, weather and road conditions, etc.). Road information are then processed in real time, or near real time, so that self-driving vehicles can make driving decisions (e.g., accelerate, brake, turn, etc.) in response to changing road conditions. For self-driving vehicles to operate properly, it is critical that sensors and/or devices captures useable data regardless of environmental conditions. For example, during sunrise or sunset, there can be instances in which the sun is directly in a field of view of a camera mounted on a self-driving vehicle. Due to brightness of the sun relative to surrounding scene, images captured by the camera can be over exposed. In such instances, the camera is no longer able to collect useable image data for which the self-driving vehicle can process and derive valuable information. The over exposed images lack optical details needed to properly analyze road information. Further, direct sunlight can cause lens flares that adds non-existing artifacts to images that could potentially interfere with the self-driving vehicle's decision-making process. Moreover, a prolonged exposure to direct sunlight can potentially damage imaging sensors in the camera. Similarly if images are under exposed, road information, such as road signs, road conditions, etc., would be too dark for the self-driving vehicle to derive meaningful information.

Accordingly, disclosed herein are a system associated with self-driving vehicle technology and a method of controlling the system that enables cameras onboard a self-driving vehicle to capture quality images under any daylight conditions. For example, various embodiments described herein are directed to an adaptive neutral density filter system for a self-driving vehicle. The adaptive neutral density filter system can include a control module that, based on height of the sun, or amount of ambient light, or in any combination thereof, to vary transmittance of a neutral density filter. Such a system allows light entering the cameras to be optimally compensate for brightness. As described in the exemplary embodiments herein, the adaptive neutral density filter system can effectively adjust amount of light entering into the cameras such that the environment the cameras "see" is always under optimal lighting condition regardless of its actual lighting condition.

In an embodiment, the adaptive neutral density filter system for the self-driving vehicle can include a graduated neutral density filter. The graduated neutral density filter can vary its optical density (e.g., transmittance) along an axis. For example, the optical density increases (e.g., transmittance decreases) from a bottom to a top of the graduated neutral density filter. The graduated neutral density filter allows images captured from imaging devices to have proper exposure. For example, when the sun is directly in a field of view of a camera onboard a self-driving vehicle, captured images are over exposed (e.g., washed out). In this example, the adaptive neutral density filter system can move the graduated neutral density filter to a position such that subsequent captured images are not over exposed. In some instances, the captured images can have regions that are overly bright relative to other regions. In such instances, the adaptive neutral density filter system can move the graduated neutral density filter to a position such that in subsequent captured images, the overly bright regions of the images are minimized.

In another embodiment, the adaptive neutral density filter system can include a plurality of neutral density filters. The plurality of neutral density filters can include a first neutral density filter with a first optical density, a second neutral density filter with a second optical density, a third neutral density filter with a third optical density, etc. The plurality of neutral density filters with various optical densities allow images captured from imaging devices to have proper exposure. For example, when the sun is directly in a field of view of a camera onboard a self-driving vehicle, the adaptive neutral density filter system switches a neutral density filter into the field of view of the camera such that subsequent captured images are not over exposed.

In some embodiments, the adaptive neutral density filter system can include a housing configured to clean surfaces of the neutral density filters. The housing can maintain cleanliness of the surfaces so that neutral density filters have less road debris that are typically associated with driving (e.g., dust particles, insets, etc.). This allows the imaging devices to capture quality images.

In various embodiments, the method of controlling the adaptive neural density filter system can include moving a graduated neutral density filter to a particular location within an allowable range to ensure images are properly exposed. In another embodiment, the method of controlling the adaptive neutral density filter system can include switching of neutral density filters to ensure images are properly exposed. In some embodiments, the method can include determining whether or not an image over exposed or under exposed. If the image is over exposed, the method increases optical density of the neutral density filters. If the image is under exposed, the method decreases optical density of the neutral density filters. In some embodiments, the method can include determining regions in an image that are over exposed relative to other regions in the image and subsequently adjust a graduated neutral density filter to eliminate or minimize the regions that were over exposed.

FIG. 1 depicts an example self-driving vehicle 100 according to an embodiment of the current disclosure. The self-driving vehicle 100 in the present disclosure is intended to represent a vehicle can sense its surrounding environment and navigate in such an environment with a limited human input or without any human input. In various embodiments, the self-driving vehicle 100 can accelerate or brake in real time, without human input, based on inputs from sensors and/or devices onboard the self-driving vehicle 100. For example, if the self-driving vehicle 100 senses, based on the inputs from the onboard sensors and/or devices, that it is fast approaching a traffic stop, the self-driving vehicle 100 may take braking action to gradually bring itself to a complete stop. Alternatively, in another example, if the self-driving vehicle 100 senses, based on the inputs from the onboard sensors and/or devices, that a road is wide open and is free of obstacles, the self-driving vehicle 100 may accelerate from a stop. In some embodiments, the self-driving vehicle 100 can control steering in real time, without human input, based on the inputs from the onboard sensor and/or devices. For example, the self-driving vehicle 100, based on its onboard GPS coordinates and inputs from other onboard sensors and/or devices, may decide to make a right or a left turn at an upcoming traffic light. In this example, the self-driving vehicle 100 can, if other conditions are met (e.g., making a complete stop at the traffic light, the traffic light turned green, no crossing vehicles, etc.), direct itself to make the right or the left turn at the traffic light. In general, the self-driving vehicle 100 can effectuate any control to itself that a human driver can on a conventional vehicle. For example, the self-driving vehicle 100 can accelerate, brake, turn left or right, or drive in reverse direction just as a human driver can on a conventional vehicle. The self-driving vehicle 100 can also sense environmental conditions, gauge spatial relationships (e.g., distances between objects and itself), detect and analyze road signs just as a human driver can. Moreover, the self-driving vehicle 100 can perform more complex operations, such as parallel parking, parking in a crowded parking lot, collision avoidance, etc., without any human input.

It is of note here that the phrase, "real time human input," is intended to represent human inputs that are needed to drive a conventional vehicle. For example, real time human input can be understood to mean concurrent control of a conventional vehicle, such as shifting gears (manual transmission), steering the steering wheel, stepping the brake pedal, stepping the accelerator, etc.

Although in the example of FIG. 1, the self-driving vehicle 100 is shown as a four-door passenger car (e.g., a sedan), the self-driving vehicle 100 is not just limited to such a vehicle configuration. For example, in various embodiments, the self-driving vehicle 100 can be a station wagon, a van, a hatchback, a two-door coupe or sports car, a truck, an sports utility vehicle or other types of utility vehicles, a commercial truck (e.g., a semi-truck), a bus, a recreation vehicle, etc. Many vehicle types are contemplated. Further, it is of note here that the word "vehicle" as used in this disclosure typically denotes a vehicle that drives on the ground, but vehicle may also include a vehicle that flies in the sky (e.g., drones, helicopter, airplanes, etc.).

In various embodiments, the self-driving vehicle 100 can include a plurality of adaptive neutral density filter system corresponding to a plurality of cameras onboard the self-driving vehicle 100. In general, each onboard camera has a corresponding adaptive neutral density filter system. In some embodiments, the self-driving vehicle 100 can have one adaptive neutral density filter system per side of the self-driving vehicle 100. For example, the self-driving vehicle 100 can have a front-side adaptive neutral density filter system 102a, a right-side adaptive neutral density filter system 102c, a back-side adaptive neutral density filter system 102e, and a left-side adaptive neutral density filter system 102h. In some embodiments, the self-driving vehicle 100 can have two adaptive neutral density filter systems per side of the self-driving vehicle 100. For example, as shown in the example of FIG. 1, the self-driving vehicle 100 can include two front-side adaptive neutral density filter systems 102a and 102b, two right-side adaptive neutral density filter systems 102c and 102d, two back-side adaptive neutral density filter systems 102e and 102f, and two left-side adaptive neutral density filter systems 102g and 102h. Many variations are possible. The adaptive neutral density filter system is described in more detail herein with reference to FIGS. 2A-4.

Moreover, in some embodiments, the self-driving vehicle 100 can include a structure 104 mounted on a roof or a top of the self-driving vehicle 100. The structure 104 can have one or more sides or facets with each side or facet mechanically coupled to an adaptive neutral density filter system 106. In some embodiments, the structure 104 can have four sides with each side mechanically coupled to an adaptive neutral density filter system 106. In some embodiments, such as in the example shown in FIG. 1, the structure 104 can have eight sides with each side mechanically coupled to an adaptive neutral density filter system 106. In general, the structure 104 can have any number of sides or facets with any number of adaptive neutral density filter systems per side. For example, the structure 104 can have six sides with two adaptive neutral density filter systems per side. In another example, the structure 104 can have five sides with three adaptive neutral density filter systems per side. Many variations are contemplated.

In the example of FIG. 1, in some embodiments, the self-driving vehicle 100 can have two adaptive neutral density filter systems per side of the self-driving vehicle 100. In some embodiments, the front-side adaptive neutral density filter systems 102a and 102b can be integrated into front headlights of the self-driving vehicle 100. For example, the adaptive neutral density filter system 102a can be mechanically coupled to a housing of a left-front headlight of the self-driving vehicle 100. Likewise, the adaptive neutral density filter system 102b can be mechanically coupled to a housing of a right-front headlight of the self-driving vehicle 100. In general, it is advantageous to integrate the front-side adaptive density filter systems 102a and 102b into the front headlights of the self-driving vehicle 100. For example, integrating the front-side adaptive neutral density filter systems 102a and 102b into the front headlamps allow onboard cameras to capture quality images under suboptimal lighting conditions, such as driving at nighttime or driving in an underground parking garage. In various embodiments, the front-side adaptive neutral density filter systems 102a and 102b can capture images of objects or scenes in front of the self-driving vehicle 100 (right direction in FIG. 1). In some embodiments, an image capturing direction (e.g., filter axis direction) of the front-side adaptive neutral density filter systems 102a and 102b may be fixed. For example, the front-side adaptive neutral density filter systems 102a and 102b are optically affixed to the front headlights in a direction parallel or substantially parallel to the self-driving vehicle 100. In some embodiments, the image capturing direction (e.g., filter axis direction) of the front-side adaptive neutral density filter systems 102a and 102b may be variable. For example, the image capturing direction of the front-side adaptive neutral density filter systems 102a and 102b can move either slightly to left or right in response to a change in steering direction. Mechanisms to change the image capture direction of the front-side adaptive neutral density filter systems 102a and 102b can be implemented by any suitable mechanism that is known to one of ordinary skills in the art.

In the example of FIG. 1, in some embodiments, the back-side adaptive neutral density filter systems 102e and 102f can be integrated into rear taillights of the self-driving vehicle 100. For example, the adaptive neutral density filter system 102e can be mechanically coupled to a housing of a right-rear taillight of the self-driving vehicle 100. Likewise, the adaptive neutral density filter system 102f can be mechanically coupled to a housing of a left-rear taillight of the self-driving vehicle 100. In general, it is advantageous to integrate the back-side adaptive density filter systems 102e and 102f into the taillights of the self-driving vehicle 100. For example, integrating the back-side adaptive neutral density filter systems 102e and 102f into the rear taillamps allows onboard cameras to capture quality images while the self-driving vehicle 100 is in reverse or backing up. In various embodiments, the back-side adaptive neutral density filter systems 102e and 102f can capture images of objects or scenes in back of the self-driving vehicle 100 (left direction in FIG. 1). Similar to the front-side adaptive neutral density filter systems 102a and 102b, image capturing direction for the back-side neutral density filter systems 102e and 102f may be optically fixed or variable.

In the example of FIG. 1, in some embodiments, the right-side adaptive neutral density filter systems 102c and 102d can be integrated to any suitable location on right side of the self-driving vehicle 100. For example, the right-side adaptive neutral density filter systems 102c and 102d can be integrated into an A-pillar (e.g., pillar that holds a front windshield of a sedan or a coupe) and a C-pillar (e.g., pillar that holds a back windshield of a sedan or a coupe) of the self-driving vehicle 100 respectively. In another example, the right-side adaptive neutral density filter systems 102c and 102d can be integrated into a B-pillar (e.g., pillar between a front door and a back door of a four-door vehicle) and the C-pillar of the self-driving vehicle 100 respectively. In yet another example, the right-side adaptive neutral density filter systems 102c and 102d can be integrated into the A-pillar and the B-pillar of the self-driving vehicle 100 respectively. Many variations are possible. In general, the right-side adaptive density filter systems 102c and 102d allow the self-driving vehicle 100 to capture images corresponding to objects or scenes on the right side of the self-driving vehicle 100. In some embodiments, the right-side adaptive neutral density filter system 102c can extend field of view of the front-side adaptive neutral density filter system 102b to include detecting objects or scenes that the front-side adaptive neutral density filter system 102b does not detect. Similarly, the right-side adaptive neutral density filter system 102d can extend field of view of the back-side adaptive neutral density filter system 102e to include detecting objects or scenes that the back-side adaptive neutral density filter system 102e does not detect.

In the example of FIG. 1, in some embodiments, the left-side adaptive neutral density filter systems 102g and 102h can be integrated to any suitable location on left side of the self-driving vehicle 100. For example, the left-side adaptive neutral density filter systems 102g and 102h can be integrated into the C-pillar and the A-pillar of the self-driving vehicle 100 respectively. In another example, the left-side adaptive neutral density filter systems 102g and 102h can be integrated into the C-pillar and the B-pillar of the self-driving vehicle 100 respectively. In yet another example, the right-side adaptive neutral density filter systems 102g and 102h can be integrated into the B-pillar and the A-pillar of the self-driving vehicle 100 respectively. Many variations are possible. In general, the left-side adaptive density filter systems 102g and 102h allow the self-driving vehicle 100 to capture images corresponding to objects or scenes on the left side of the self-driving vehicle 100. In some embodiments, the left-side adaptive neutral density filter system 102g can extend field of view of the back-side adaptive neutral density filter system 102f to include detecting objects or scenes that the back-side adaptive neutral density filter system 102f does not detect. Similarly, the left-side adaptive neutral density filter system 102h can extend field of view of the front-side adaptive neutral density filter system 102a to include detecting objects or scenes that the front-side adaptive neutral density filter system 102a does not detect.

In various embodiments, number and mounting positions of the adaptive neutral density filter systems may be different from the example depicted in FIG. 1. For example, the number of the adaptive neutral density filter systems may be less than or greater than eight. In another example, the number of the adaptive neutral density filter systems on each side of the self-driving vehicle 100 may be less than or greater than two. In an embodiment, a number (e.g., three) of the adaptive neutral density filter systems on a front-side of the self-driving vehicle 100 may be greater than another number (e.g., two) of the adaptive neutral density filter systems on other sides of the self-driving vehicle 100. In this embodiment, the self-driving vehicle 100 is capable of capturing more images on the front-side than other sides. Such an embodiment is advantageous because the self-driving vehicle 100 drives in forward direct most of the time.

Figure 2A:
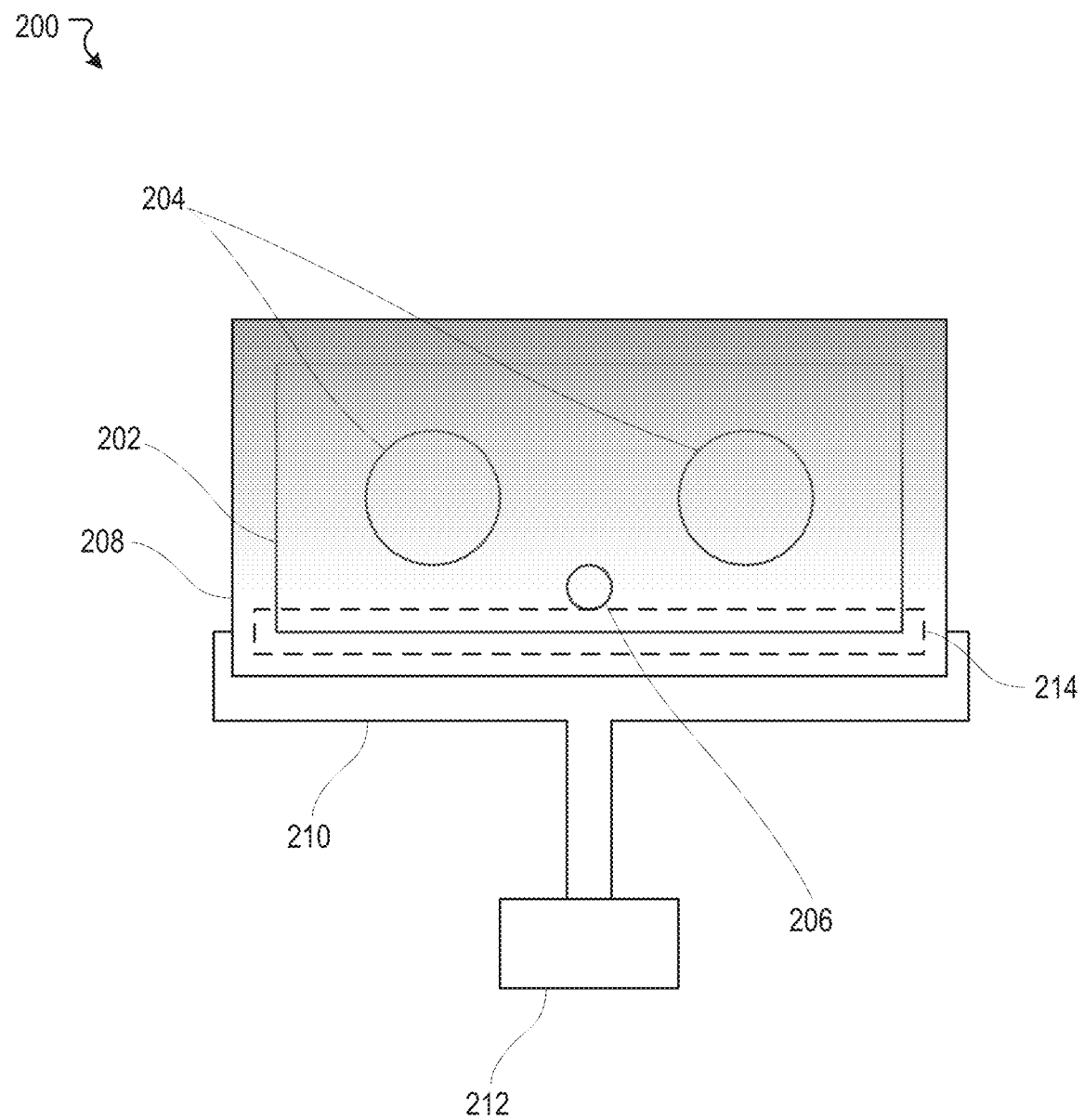
FIGS. 2A and 2B depict a frontal view and a side view of an example adaptive neutral density filter system according to an embodiment of the current disclosure.
Figure 2B:
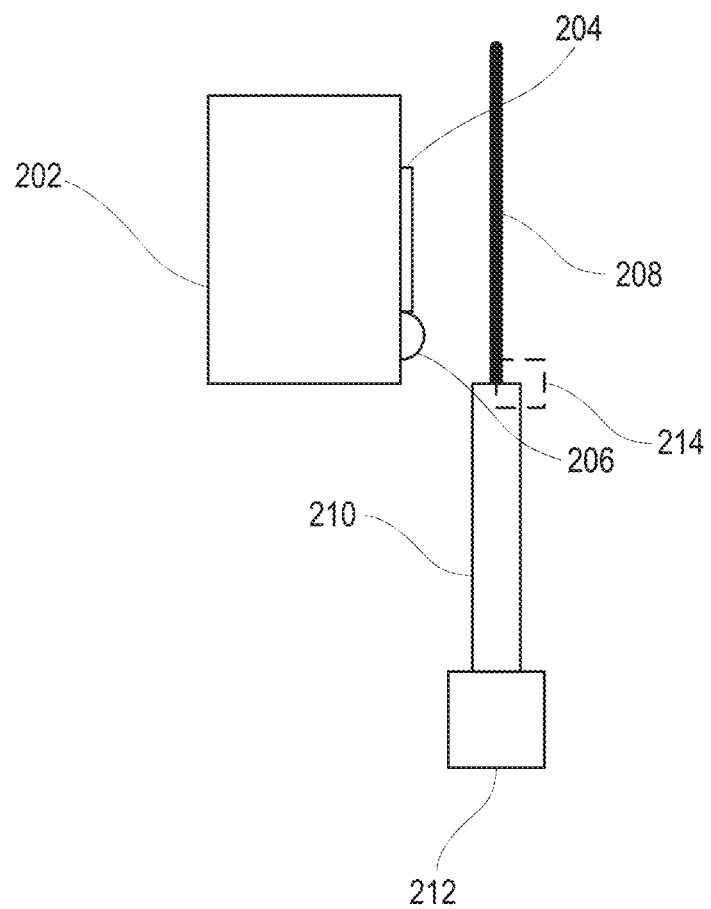

FIGS. 2A and 2B depict a frontal view and a side view of an example adaptive neutral density filter system 200 according to an embodiment of the current disclosure. In some embodiments, the adaptive neutral density filter systems 102*a*-102*h* and 106 of FIG. 1 can be implemented as the adaptive neutral density system 200. As shown in FIGS. 2A and 2B, the adaptive neutral density filter system 200 can work in conjunction with a camera 202. In general, the adaptive neutral density filter system 200 can control exposure of a scene based on height of the sun or amount of ambient light. For example, if ambient light is abundant, the adaptive neutral density filter system 200 limits light entering the camera 202 so that images are not over exposed. In another example, if the ambient light is suboptimal, the adaptive neutral density filter system 200 allows maximum light entering the camera 202 to ensure that images are not under exposed. In some instances, the ambient light entering the camera 202 can be unevenly distributed. For example, images captured from the camera 202 can have regions that are overly bright compare to other regions in the captured images. In such instances, the adaptive neutral density filter system 200 can be configured such that the ambient light entering the camera 202 is more uniformly distributed, thus normalizing overall exposure of images. In some embodiments, an ambient light sensor 206 can be used to detect or determine amount of light entering the camera 202.

In some embodiments, one or more processors onboard a self-driving vehicle (e.g., such as the self-driving vehicle 100 of FIG. 1) can process, using one or more image processing techniques, images captured with the adaptive neutral density filter system 200 to determine relative exposures of the captured images. Based on whether the captured images are over exposed or under exposed, the adaptive neutral density filter system 200 compensates light entering the camera 202 so that subsequent images have just the right exposure. In some embodiments, the one or more processors onboard the self-driving vehicle can process, using one or more image processing techniques, images captured with the adaptive neutral density filter system 200 to determine image quality. In such embodiments, angle of incident, and hue, saturation, and brightness value of the captured image can be compared with a known good image. Based on these image quality metrics, the adaptive neutral density filter system 200 compensates light entering the camera 202 so that subsequent images have ideal image quality metrics. In some embodiments, the one or more processors onboard the self-driving vehicle can process, using one or more image processing techniques, images captured with the adaptive neutral density filter system 200 to determine relative location of the sun within the field of view of the camera 202. Based on the location of the sun, the adaptive neutral density filter system 200 compensates lights entering the camera 202 so the light is uniformly distributed.

In the examples depicted in FIGS. 2A and 2B, in some embodiments, the camera 202 can include one or more apertures 204 through which images can be captured. For example, as shown in the example of FIGS. 2A and 2B, the camera 202 can include dual imaging sensors, with each imaging sensor having its own aperture 204. The one or more aperture 204 allows light to enter, thus allowing the imaging sensors to capture image data. In this example, one imaging sensor can use utilized to capture good quality images while the other imaging sensor can be utilized to determine sun's relative position in a field of view of the camera 202. In general, it is advantageous to have this dual imaging sensor setup because constant exposure to sunlight can be damaging to the imaging sensors. Thus, in this setup, one imaging sensor can be dedicated to capturing images of scenes around a self-driving vehicle and the other imaging sensor can be dedicated to tracking the sun. In some embodiments, the visible camera 202 can also include an ambient light sensor 206. The ambient light sensor 206 can be configured to measure or determine amount of ambient light. In some embodiments, the ambient light sensor 206 can work in conjunction with the adaptive neutral density filter system 200 to compensate light entering the camera 202. For example, the adaptive neutral density filter system 200 can select an optimal neutral density filter setting based on the amount of ambient light measured by the ambient light sensor 206. In some embodiments, the amount of ambient light can be directly measured by the imaging sensors through the apertures 204. For example, the imaging sensors in the camera 202, in addition to capturing images, can also capture light intensity data (e.g., brightness). In this example, the adaptive neutral density filter system 200 can select an optimal neutral density filter setting based on this light intensity data.

While not shown in the example depicted in FIGS. 2A and 2B, in various embodiments, imaging sensors can be configured to sense, detect, and capture intensity of electromagnetic radiation incident on the imaging sensors. The imaging sensors can generate image data based on the electromagnetic radiation. In some embodiments, the imaging sensors can be configured to sense, detect, and capture electromagnetic radiation in the visible range of the electromagnetic spectrum. In such embodiments, the imaging sensor can generate a full-color image based on the incident electromagnetic radiation. In some embodiments, the imaging sensors can configured to sense, detect, and capture electromagnetic radiation in the infrared range of the electromagnetic spectrum. In such embodiments, the imaging sensor can generate a thermal image based on the incident electromagnetic radiation. In general, the thermal image is more advantageous than the full-color image when detecting or recognizing objects during nighttime. In various embodiments, the imaging sensors can be any suitable sensor type. For example, the imaging sensors can be complimentary metal-oxide-semiconductor (CMOS) type sensors or charge-coupled device (CCD) type sensors.

In general, the adaptive neutral density filter system 200 can be implemented in a plurality of different ways. In some embodiments, the adaptive neutral density filter system 200 can be implemented with a graduated neutral density filter. In such embodiments, the graduated neutral density filter has an optical density (i.e., transmittance) that varies linearly in along an axis. For example, in an embodiment, the optical density of the graduated neutral density filter can increase (e.g., transmittance decreases) from a bottom to a top of the graduated neutral density filter. In another embodiment, instead of varying the optical density vertically, the optical density of the graduated neutral density filter can vary horizontally. For example, the optical density increases linearly from a right to a left or a left to a right of the graduated neutral density filter. In some embodiments, the optical density of the graduate neutral filter can vary radially. For example, the optical density increases radially from a center to an outer region of the graduated neutral filter. Many variations are possible and many variations are contemplated. In some embodiments, the adaptive neutral density filter system 200 can be implemented with a series of neutral density filters with each neutral density filter having a particular optical density value. Various embodiments of the adaptive neutral filter system 200 are discussed in more detail herein with respect to FIGS. 3-4.

In the examples depicted in FIGS. 2A and 2B, in some embodiments, the adaptive neutral density filter system 200 can include a graduated neutral density filter 208, a holder 210, an actuator 212, and a cleaning apparatus 214. As discussed, in some embodiments, the graduated neutral density filter 208 can vary its optical density (e.g., transmittance) linearly along an axis. For example, as shown in the example of FIG. 2A, the graduated neutral density filter 208 varies its optical density or transmittance from a bottom to a top of the filter. In this example, lower portions of the graduated neutral density filter 208 have a lower optical density value (e.g., high transmittance) than upper portions of the graduated neutral density filter 208 which have a higher optical density value (e.g., low transmittance).

In the examples depicted in FIGS. 2A and 2B, in some embodiments, the holder 210 can be a mechanical coupling device that connects the graduated neutral density filter 208 to the actuator 212. In some embodiments, the holder 210 can include grooves or inserts that provide attaching points for the graduated neutral density filter 208. For example, as shown in the examples of FIGS. 2A and 2B, the holder 210 provides a mechanical anchor for the neutral density filer 208. In some embodiments, the holder 210 can also include an attaching point where the actuator 212 can be attached.

In the examples depicted in FIGS. 2A and 2B, in some embodiments, the actuator 212 can be a linear actuator that can create motion along an axis. For example, the linear actuator can move up or down along a vertical axis or forward or backward along a horizontal axis. In some embodiments, the actuator 212 can actuate the graduated neutral density filter 208, coupled to the holder 210, in response to various lighting conditions. For example, during bright light conditions, the actuator 212 lowers the graduated neutral density filter 208 to increase optical density (or decrease transmittance) so images captured by the camera 202 would not be over exposed. In another example, during low light conditions, the actuator 212 raises the graduated neutral density filter 208 to decrease optical density (or increase transmittance) so images captured by the camera 202 would not be under exposed. In yet another example, a scene can have regions that are bright and regions that are not so bright. In this example, depending on intensity of light, the actuator 212 can position the graduated neutral density filter 208 to a particular location such that the bright regions are attenuated more relative to other regions in the scene.

In some embodiments, the actuator 212, in addition to moving along an axis (e.g., radially), can also rotate about another axis. In such embodiments, the actuator 212 can rotate the graduated neutral density filter 208, coupled to the holder 210, about the another axis in response to various lighting conditions. For example, in a scene where there may be pockets of brightness, it may be more desirable to position the graduated neutral density filter rotationally, rather than linearly, to ensure the light seen by the camera 202 is uniformly distributed. Details of how the actuator 212 actuates in response to light are described in more detail below with reference to FIG. 2C.

In the examples depicted in FIGS. 2A and 2B, in some embodiments, the cleaning apparatus 214 can be configured to clean one or more surfaces of neutral density filters. For example, the cleaning apparatus 214 can be configured to clean a surface of the graduated neutral density filter 208. In general, as a self-driving vehicle drives on roads, foreign debris (e.g., oil, dust, moisture, mud, insects, etc.) may attach or stick to the surface of the graduated neutral density filter 208. These foreign debris may interfere or partially block field of view of onboard cameras. In some embodiments, the cleaning apparatus 214 can chemically clean the graduated neutral density filter 208. For example, the cleaning apparatus 214 may employ a surfactant suitable to remove organic debris, such as oils, insect, etc. In some embodiments, the cleaning apparatus 214 can employ a superabsorbent polymer (SAP) to remove moisture. In some embodiments, the cleaning apparatus 214 can employ a hydrophilic solution to remove or dissolve water soluble debris. In some embodiments, the cleaning apparatus 214 can distribute a cleaning solution to the graduated neutral density filter 208 to clean the surface. In such embodiments, the cleaning apparatus 214 may further include a drying mechanism to dry the surface of the graduated neutral density filter 208 after it is cleaned. In an embodiment, the drying mechanism can be a drying clothes. In another embodiment, the drying mechanism can be an air dryer or heater.

In some embodiments, the cleaning apparatus 214 can be configured to mechanically clean the graduated neutral density filter 208. For example, the cleaning apparatus 214 may distribute compressed gas (e.g., air, gaseous nitrogen, inert gas, etc.) to the graduated neutral density filter 208 to remove foreign debris thereon. In another example, the cleaning apparatus 214 can employ a wiper that moves on the surface of the graduated neutral density filter 208. Further, the wiper can include a wiper blade or a wiper cloth that travels along the surface of the graduated neutral density filter 208. In yet another example, the cleaning apparatus 214 can peel off a thin film that has been previously adhered to the surface of the graduated neutral density filter 208.

In some embodiments, the cleaning apparatus 214 can be configured to electromagnetically clean the graduated neutral density filter 208. For example, the cleaning apparatus 214 can apply an electric field or a magnetic field to remove ionic or charged foreign debris from the surface of the graduated neutral density filter 208.

In various embodiments, the cleaning apparatus 214 can combine two or more of the cleaning processes described above. For example, the cleaning apparatus 214 can inject cleaning solution on the surface of the graduated neutral density filter 208 while a wiper wipes the surface. In another example, the cleaning apparatus 214 can apply vibration while compressed gas is distributed to the surface of the graduated neutral density filter 208. Many variations are possible.

Figure 2C:
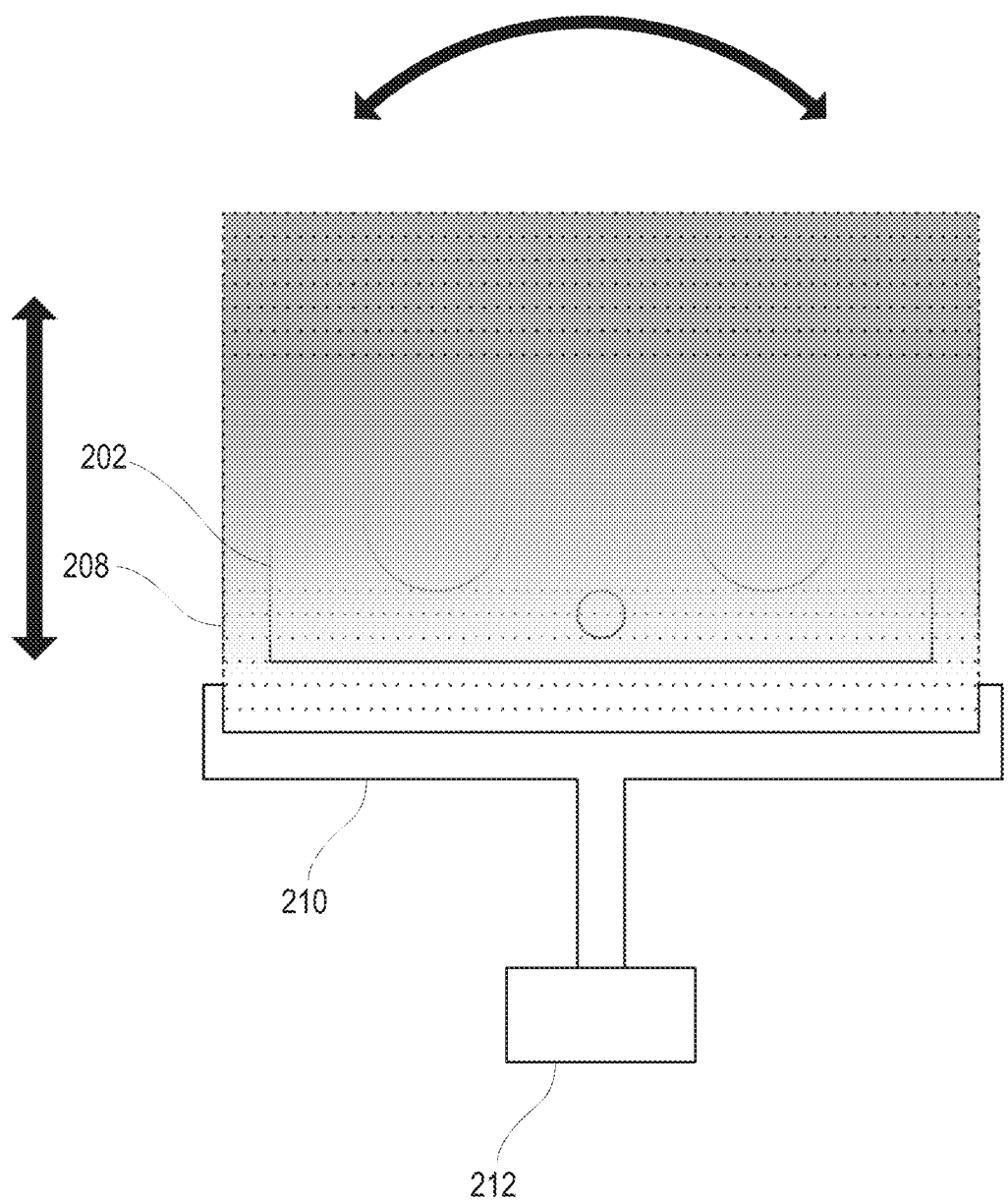
FIG. 2C illustrates an example operation of an adaptive neutral density filter system according to an embodiment of the current disclosure.

FIG. 2C illustrates an example operation of an adaptive neutral density filter system 200 according to an embodiment of the current disclosure. As discussed, in various embodiments, the camera 202 can work in conjunction with the adaptive neutral density filter system 200. Further, in various embodiments, the adaptive neutral density filter system 200 can include a graduated neutral density filter 208 that is mechanically coupled to an actuator 212 via a holder 210 along with a cleaning apparatus (not shown in FIG. 2C). In such embodiments, the adaptive neutral density filter system 200 can control amount of light entering the camera 202 by moving the graduated neutral density filter 208 to a particular location within an allowable range of the actuator 212. Because the graduate neutral density filter 208 varies its optical density (transmittance) linearly from a top to a bottom, the amount of light entering the camera 202 can be controlled in a precise manner. For example, either the ambient light sensor 206 or the imaging sensors can determine the amount of light entering the camera 202. Based on this data, through a control module, the actuator 212 can move either up or down such that the amount of light entering the camera 202 is optimally compensated. For instance, if light entering the camera 202 is bright, actuator 212 lowers the graduated neutral density filter 208 which correspondingly causes the graduated neutral density filter 208 to increase optical density (decrease transmittance). Similarly, if light entering the camera 202 is low, the actuator 212 raises the graduated neutral density filter 208 which correspondingly causes the graduated neutral density filter 208 to decrease optical density (increase transmittance).

In some instances, captured images may have regions of unequal brightness. In such instances, it may be desirable to move the graduated neutral density filter 208 to a particular position, within allowable ranges, such that lights from brighter regions are more attenuated then lights from not so bright regions, thereby improving overall exposure of the captured images. For example, this can be achieved, depending on the location of the sun, either by raising or lowering the graduated neutral density filter 208 to a particular location or by rotating the graduated neutral density filter 208 to a particular locations, or both.

In the example depicted in FIG. 2C, the camera 202 can be a dual imaging camera system in which a first imaging sensor is utilized to capture good quality images while a second imaging sensor is utilized to track the sun. Images captured from the second imaging sensor can be processed, with one or more image processing techniques, to determine a relative location of the sun. This information may be used at least, in part, to determine or discern regions of unequal brightness in the captured images of the first imaging sensor.

Figure 3:
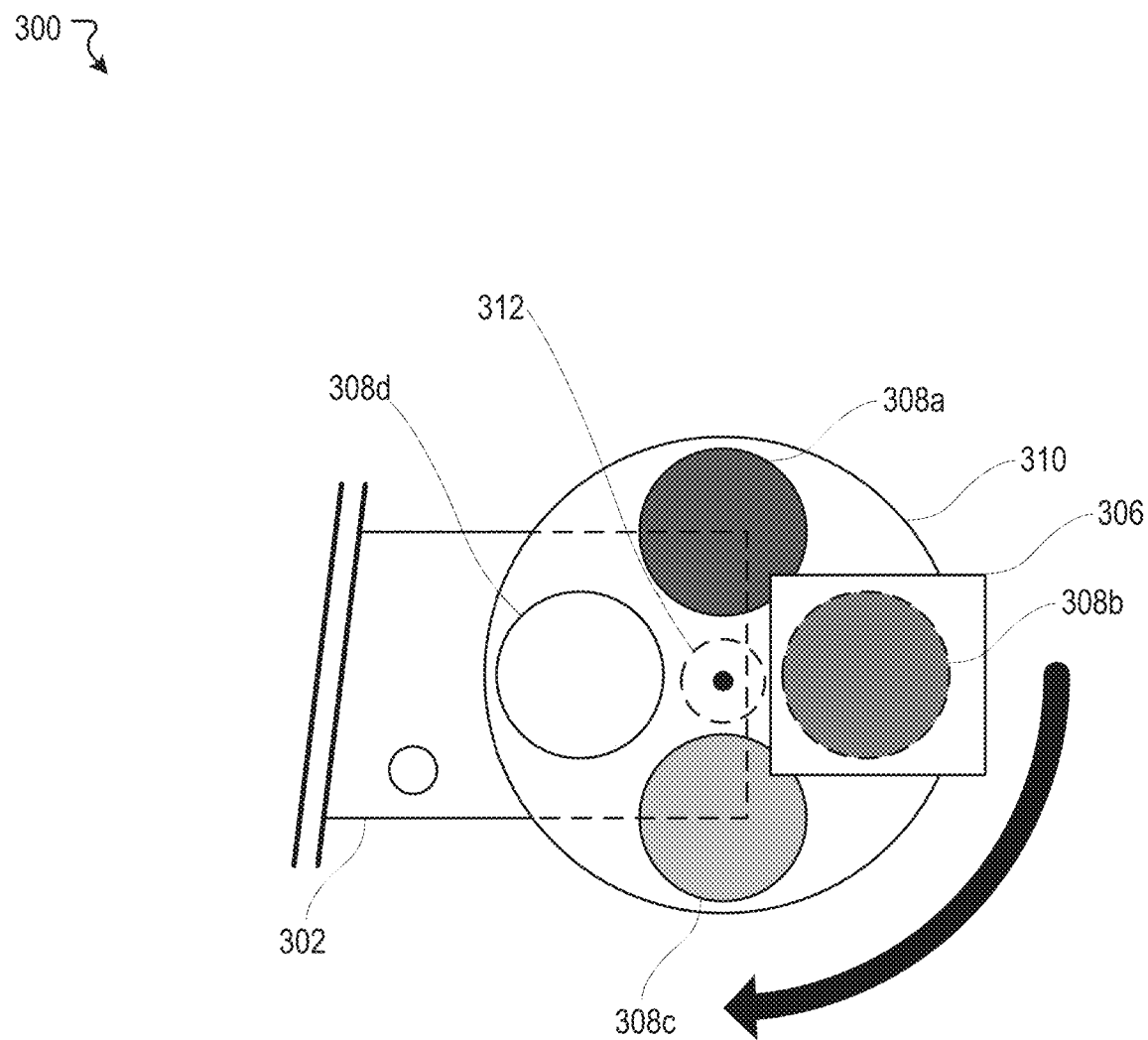
FIG. 3 depicts an example of an adaptive neutral density filter system according to an embodiment of the current disclosure.

FIG. 3 depicts an example of an adaptive neutral density filter system 300 according to an embodiment of the current disclosure. In some embodiments, the adaptive neutral density filter system 200 of FIGS. 2A-2C can be implemented with two adaptive neutral density filter systems 300 (one adaptive neutral density filter system 300 for each camera aperture). As discussed, the adaptive neutral density filter system can be implemented in a plurality of different ways. The adaptive neutral density filter system 200 of FIGS. 2A-2C utilizes a graduated neutral density filter with a linear actuator, mechanically coupled to a holder, to vary its optical density. In some embodiments, the adaptive neutral density filter system 300 can be implemented using a series of neutral density filters with each neutral density filter having a particular optical density. In the example depicted in FIG. 3, in various embodiments, the adaptive neutral density filter apparatus 300 can include a plurality of neutral density filters 308a-308d, a wheel 310, an actuator 312, and a cleaning apparatus 306.

In the example depicted in FIG. 3, in various embodiments, the plurality of the neutral density filters 308a-308d can be concentrically arranged around a rotational axis, at which the actuator 312 is positioned. Each of the neutral density filters 308a-308d can be mechanically coupled to the actuator 312 via the wheel 310. In some embodiments, as shown in the example of FIG. 3, the wheel 310 can have a wheel shape with cutouts for each neutral density filters 308a-308d. In some embodiments, the wheel 310 can have a spoke-like shape, in which each neutral density filter 308a-308d is individually connected to the actuator 312 via a shaft or stick. In various embodiments, the plurality of the neutral density filters 308a-308d can be arranged at an equal interval angle (e.g., π/4 or π/8 radian when number of neutral density filter is eight). Each neutral density filters can have a distinct optical density value, and therefore, allow the adaptive neutral density filter system 300 to account for different attenuation of light under various lighting conditions.

In some embodiments, the adaptive neutral density filter system 300 can include four neutral density filters 308a-308d. More specifically, for example, as shown in the example of FIG. 3, the four neutral density filters can include a neutral density filter 308d with an optical density of 0.0 (a transmittance of 100%), a neutral density filter 308c with an optical density of 0.3 (a transmittance of 50%), a neutral density filter 308b with an optical density of 0.6 (a transmittance of 25%), and a neutral density filter 308a with an optical density of 0.9 (a transmittance of 12.5%). In general, from one neutral density filter to a next neutral density filter, the optical density can increase by a value of 0.3.

In some embodiments, the adaptive neutral density filter system 300 can include six neutral density filters. For example, the six neutral density filters can include a neutral density filter with an optical density of 0.0 (a transmittance of 100%), a neutral density filter with an optical density of 0.3 (a transmittance of 50%), a neutral density filter with an optical density of 0.6 (a transmittance of 25%), a neutral density filter with an optical density of 0.9 (a transmittance of 12.5%), a neutral density filter with an optical density of 1.2 (a transmittance of 6.25%), and a neutral density filter with an optical density of 1.5 (a transmittance of 3.125%). In general, from one neutral density filter to a next neutral density filter, the optical density can increase by a value of 0.3.

In some embodiments, the adaptive neutral density filter system 300 can include eight neutral density filters. For example, the eight neutral density filters can include a neutral density filter with an optical density of 0.0 (a transmittance of 100%), a neutral density filter with an optical density of 0.3 (a transmittance of 50%), a neutral density filter with an optical density of 0.6 (a transmittance of 25%), a neutral density filter with an optical density of 0.9 (a transmittance of 12.5%), a neutral density filter with an optical density of 1.2 (a transmittance of 6.25%), a neutral density filter with an optical density of 1.5 (a transmittance of 3.125%), a neutral density filter with an optical density of 1.8 (a transmittance of 1.563%), and a neutral density filter with an optical density of 2.1 (a transmittance of 0.781%). In general, from one neutral density filter to a next neutral density filter, the optical density can increase by a value of 0.3. Many variations are possible and many variations are contemplated. For example, number of neutral density filters can be an odd number (e.g., three, five, seven, etc.) or any suitable number.

In the example depicted in FIG. 3, in some embodiments, the wheel 310 can be a mechanical device that connects the plurality of the neutral density filters 308a-308d to the actuator 312. In some embodiments, the wheel 310 can have a circular shape, such as the one shown in the example of FIG. 3. In some embodiments, the wheel 310 can have a square shape (e.g., four neutral density filter configuration). In some embodiments, the wheel 310 can have a hexagonal shape (e.g., six neutral density configuration). In some embodiments, the wheel 310 can have an octagonal shape (e.g., eight neutral density configuration). In general, the wheel 310 can adapt to any form or shape as long as it provides anchoring points for the plurality of neutral density filters and for the actuator 312.

In the example depicted in FIG. 3, in some embodiments, the actuator 312 can be an electric motor. For example, the actuator 312 can be a stepper motor, DC motor, brush or brushless, or AC motor, etc. May variations of electric motors are contemplated. In some embodiments, the actuator 312 can be a DC brushless motor with an encoder. In this embodiment, the encoder can provide closed loop feedback control signal that allows the DC brushless motor to be commanded to a precise position.

In the example depicted in FIG. 3, in some embodiments, the cleaning apparatus 306 can be configured to clean the neutral density filters 308a-308d. In such embodiments, the cleaning apparatus 306 can clean the neutral density filters 308a-308d as the wheel 310 rotates about the rotational axis. In general, various embodiments of the cleaning apparatus 306 can be exactly same as the cleaning apparatus 214 described with respect to FIGS. 2A and 2B.

In the example depicted in FIG. 3, the adaptive neutral density filter system 300 can control amount of light entering a camera 302 by rotating the wheel 310, about the rotational axis, to a particular position so that a neutral density filter superimposes an aperture of the camera 302. Depending on light entering the camera 302, the adaptive neutral density filter system 300 can select any one of available neutral density filters. For example, here, if light entering the camera 302 is bright, the actuator 312 rotates to a position in which a neutral density filter 308a (highest available optical density neutral density filter) superimposes the aperture of the camera 302. In this example, the neutral density filter 308a maximumly attenuates entering light so captured images would not be over exposed. In another example, if light entering the camera 302 is low, the actuator 312 rotates to a position in which a neutral density filter 308d (lowest available optical density neutral density filter) superimposes the aperture of the camera 302. In this example, the neutral density filter 308d minimally attenuates entering light so captured images would not be under exposed. In yet another example, if light entering the camera 302 is somewhere in between, the actuator 312 rotates to a position in which either neutral density filter 308b or 308c (two middle-valued optical density neutral density filters) superimposes the aperture of the camera 302. In this example, the neutral density filter 308b or 308c partially attenuates entering light so captured images are properly exposed (e.g., not over or under exposed). Many variations are possible. For example, there can be eight available neutral density filters for the adaptive neutral density filter system 300 to select from. In another example, there can be six available neutral density filters for the adaptive neutral density filter system 300 to select from.

Figure 4:
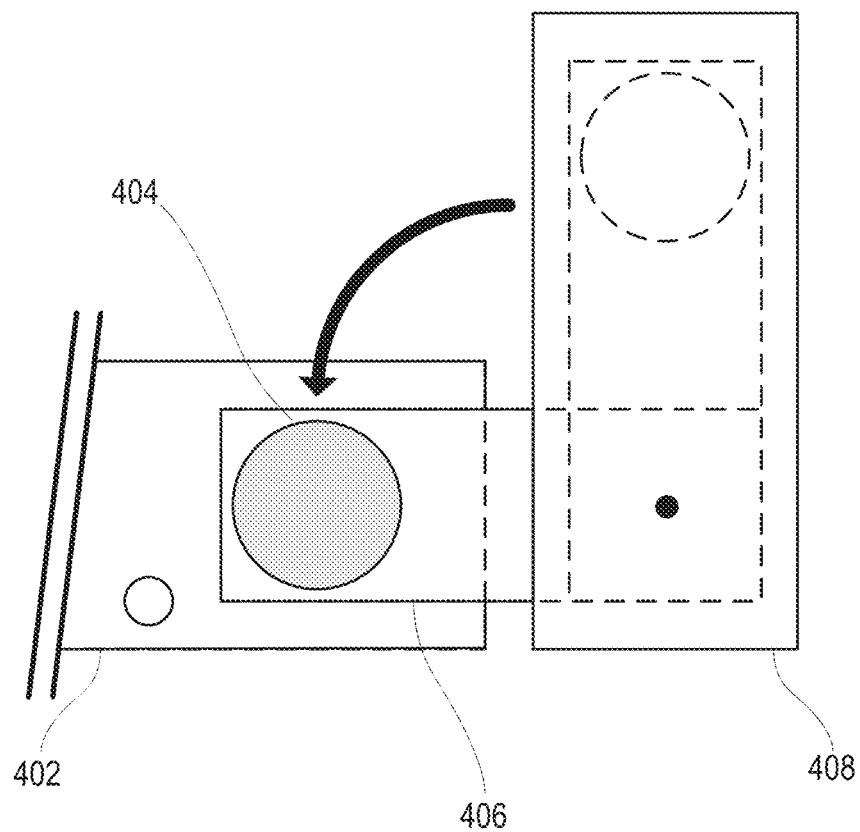
FIG. 4 depicts an example of an adaptive neutral density filter system according to an embodiment of the current disclosure.

FIG. 4 depicts an example of an adaptive neutral density filter system 400 according to an embodiment of the current disclosure. In some embodiments, the adaptive neutral density filter system 300 of FIG. 3 can be implemented as the adaptive neutral density filter 400. As discussed, the adaptive neutral density filter apparatus can be implemented in a plurality of different ways. In some embodiments, the adaptive neutral density filter apparatus 400 can be implemented using a series of neutral density filters with each neutral density filter having a particular optical density. In the example depicted in FIG. 4, in various embodiments, the adaptive neutral density filter apparatus 400 can include a plurality of neutral density filters, a plurality of arms, a housing 408, and an actuator (not shown). It is of note that although only one neutral density filter 404 and one arm 406 are shown in FIG. 4, there can be any number of neutral density filters and arms hidden in the housing 408.

In the example depicted in FIG. 4, in various embodiments, the plurality of the neutral density filters can be arranged serially along a single rotational axis of the actuator. Each of the plurality of neutral density filters (e.g., neutral density filter 404) can be mechanically coupled to each of the plurality of arms (e.g., arm 406). In some embodiments, the plurality of arms can pivot or rotate 90 degrees about a single rotational axis. For example, when actuated, a first arm (e.g., arm 406) can pivot or rotate 90 degree from a storing position to a deployed position such that a first neutral density filter (e.g., neutral density filter 404) superimposes an aperture of a camera 402. In another example, when actuated, a second arm can pivot or rotate 90 degree from the storing position to the deployed position such that a second neutral density filter superimposes the aperture of the camera 402. Many variations are possible.

In some embodiments, the adaptive neutral density filter system 400 can include four neutral density filters. For example, the four neutral density filters can include a neutral density filter with an optical density of 0.0 (a transmittance of 100%), a neutral density filter with an optical density of 0.3 (a transmittance of 50%), a neutral density filter with an optical density of 0.6 (a transmittance of 25%), and a neutral density filter with an optical density of 0.9 (a transmittance of 12.5%). In general, from one neutral density filter to a next neutral density filter, the optical density can increase by a value of 0.3.

In some embodiments, the adaptive neutral density filter system 400 can include six neutral density filters. For example, the six neutral density filters can include a neutral density filter with an optical density of 0.0 (a transmittance of 100%), a neutral density filter with an optical density of 0.3 (a transmittance of 50%), a neutral density filter with an optical density of 0.6 (a transmittance of 25%), a neutral density filter with an optical density of 0.9 (a transmittance of 12.5%), a neutral density filter with an optical density of 1.2 (a transmittance of 6.25%), and a neutral density filter with an optical density of 1.5 (a transmittance of 3.125%). In general, from one neutral density filter to a next neutral density filter, the optical density can increase by a value of 0.3.

In some embodiments, the adaptive neutral density filter system 400 can include eight neutral density filters. For example, the eight neutral density filters can include a neutral density filter with an optical density of 0.0 (a transmittance of 100%), a neutral density filter with an optical density of 0.3 (a transmittance of 50%), a neutral density filter with an optical density of 0.6 (a transmittance of 25%), a neutral density filter with an optical density of 0.9 (a transmittance of 12.5%), a neutral density filter with an optical density of 1.2 (a transmittance of 6.25%), a neutral density filter with an optical density of 1.5 (a transmittance of 3.125%), a neutral density filter with an optical density of 1.8 (a transmittance of 1.563%), and a neutral density filter with an optical density of 2.1 (a transmittance of 0.781%). In general, from one neutral density filter to a next neutral density filter, the optical density can increase by a value of 0.3. Many variations are possible and many variations are contemplated. For example, number of neutral density filters can be an odd number (e.g., three, five, seven, etc.) or any suitable number.

In the example depicted in FIG. 4, in some embodiments, the adaptive neutral density filter system 400 can include one or more arms that are mechanically coupled to one or more neutral density filters about a single rotational axis. In some embodiments, the actuator (e.g., DC brushless motor or stepper motor) can be integrated into bodies of the one or more arms and the housing 408. For example, in some embodiments, stator of the motor can be integrated into the one or more arms and rotor of the motor can be integrated into the housing. In this example, when a forward current is applied to the rotor, the stator (e.g., arm 406) can pivot or rotate 90 degrees counterclockwise to cover the aperture of the camera 402. When a reverse current is applied to the rotor, the stator (e.g., arm 406) can pivot or rotate 90 degrees clockwise to return to the housing 408. Other variations are possible.

In the example depicted in FIG. 4, in some embodiments, the adaptive neutral density filter system 400 can include a housing 408. In various embodiments, the housing 408 can provide storage for the plurality of neutral density filters and the plurality of arms. In some embodiments, the housing 408 can be configured to clean the plurality of neutral density filters after the plurality of arms returns from a deployed position back to a storing position. In such embodiments, the housing 408 can clean the neutral density filters as the arm rotates 90 degrees about the single rotational axis. In general, various embodiments of the housing 408 can be exactly same as the cleaning apparatus 214 described with respect to FIGS. 2A and 2B.

In the example depicted in FIG. 4, the adaptive neutral density filter system 400 can control amount of light entering the camera 402 by pivoting the arm 406 90 degrees from the storing position in the housing 408 to the deployed position in which the neutral density filter 404 superimposes the aperture of the camera 402. Depending on amount light entering the camera 402, the adaptive neutral density filter system 400 can select any one of available neutral density filters. For example, if light entering the camera 402 is bright, the adaptive neutral density filter system 400 deploys an arm that has a neutral density filter with a highest available optical density to superimpose the aperture of the camera 402. In this example, the selected neutral density filter maximumly attenuates entering light so captured images would not be over exposed. In another example, if light entering the camera 402 is low, the adaptive neutral density filter system 400 deploys an arm that has a neutral density filter with a lowest available optical density to superimpose the aperture of the camera 402, or in some cases, no neutral density filter at all. In this example, the selected neutral density filter minimally attenuates entering light so captured images would not be under exposed. In yet another example, if light entering the camera 402 is somewhere in between, the adaptive neutral density filter system 400 deploys an arm that has a neutral density filter with some middle-valued optical density to superimpose the aperture of the camera 402. In this example, the selected neutral density filter partially attenuates entering light so captured images are properly exposed (e.g., not over or under exposed). Many variations are possible. For example, there can be eight available neutral density filters for the adaptive neutral density filter system 400 to select from. In another example, there can be six available neutral density filters for the adaptive neutral density filter system 400 to select from.

Figure 5:
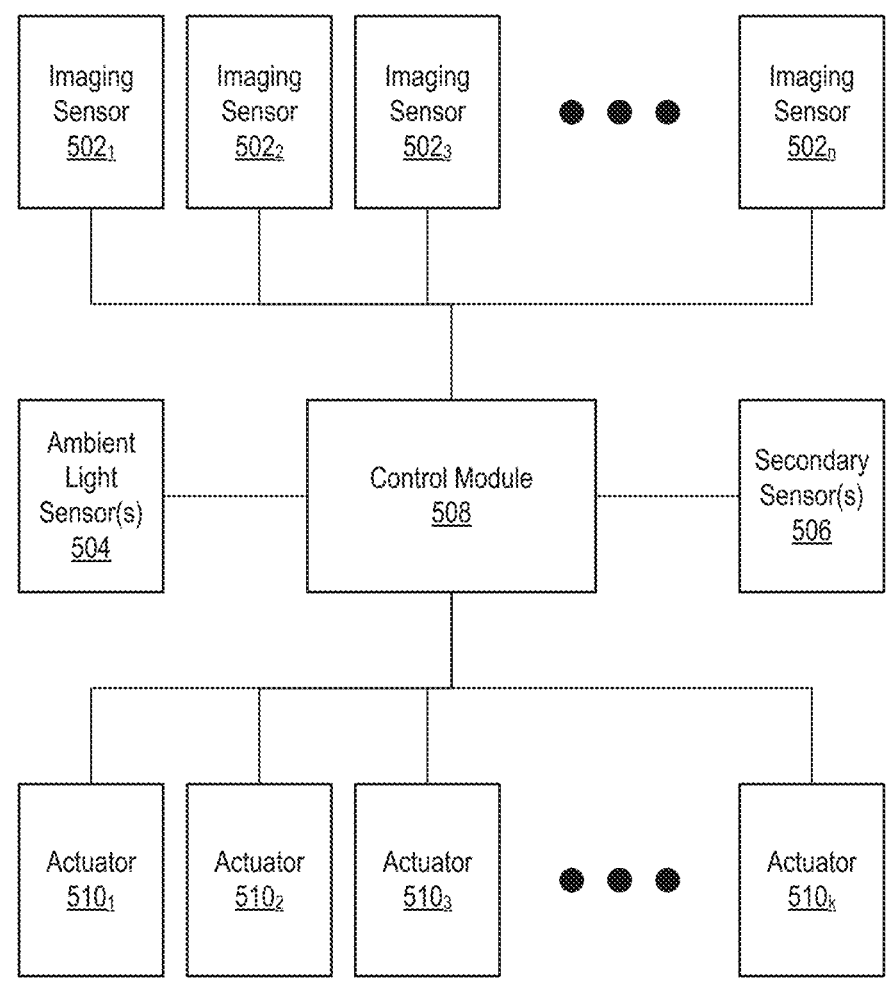
FIG. 5 is a schematic diagram depicting an example of a control system configured to control neutral density filters according to an embodiment of the current disclosure.

FIG. 5 is a schematic diagram depicting an example of a control system 500 configured to control neutral density filters according to an embodiment of the current disclosure. In the example of FIG. 5, the control system 500 includes a plurality of imaging sensors $502_1$-$502_n$ (hereinafter collectively referred to as imaging sensors 502), one or more ambient light sensors 504, one or more secondary sensors 506, a control module 508, and a plurality of actuators $510_1$-$510_k$ (hereinafter collectively referred to as actuators 510). In the example of FIG. 5, each of the imaging sensors 502 includes an adaptive neutral density filter system (e.g., the adaptive density filter system 200 shown in FIGS. 2A and 2B). Each of the imaging sensors 502 is coupled to the control module 508 and is configured to output captured image data to the control module 508. Although the imaging sensors 502 are shown to be directly coupled to each other in FIG. 5, the image sensors 502 may or may not be directly coupled to each other. Further, number of image sensors 502 may or may not be equal to number of adaptive neutral density filter systems. For example, when each adaptive neutral density filter system include one imaging sensor, number of imaging sensors 502 is equal to number of the adaptive neutral density filter system.

In the example of FIG. 5, the one or more ambient light sensors 504 are couple to the control module 508 and are configured to output ambient light data to the control module 508. In some embodiments, the one or more ambient light sensors can be configured to detect and measure ambient light. This information can be used, alone or in combination with light intensity data captured from the imaging sensors 502, to determine an optimal setting for the neutral density filters.

In the example of FIG. 5, the one or more secondary sensors 506 are coupled to the control module 506 and are configured to output a non-image data to the control module 506. In some embodiments, the one or more secondary sensors 506 can include a global positioning system (GPS). The GPS can be configured to determine a precise location of a self-driving vehicle for which the GPS is onboard. This precise location can be correlated with the sun's trajectory within a particular time of a day, within a particular day of a year to determine a particular setting for the neutral density filters.

In the example of FIG. 5, the control module 508 is intended to represent hardware (e.g., processor, memory, etc.) that can be configured to control one or more of the actuators 510 based on inputs from one or more of the image sensors 502, inputs from one or more ambient light sensors 504, and inputs from one or more secondary sensors 506. In one embodiment, the control module 508 can include a plurality of control submodules that can be coupled with one another. Each control submodules can correspond to one or more adaptive neutral density filter systems. For example. when number of actuators 510 is k, (i.e., number of the adaptive neutral density filter system is k), number of the control submodules of the control module 508 may be k as well. The control module 508 can be coupled to the actuators 510 and configured to control the actuators 510 based on a control signal output therefrom to the actuators 510. Depending on specific implementation of various embodiments, manner of transmission of the control signal can be one of wired (e.g., IEEE 802.3, USB, GPIB, etc.) or wireless communication protocol (e.g., IEEE 802.11 and IEEE 802.15).

In the example of FIG. 5, in some embodiment, the control module 508 can be configured to select an optimal neutral density filter for a given ambient light condition based on image data from the imaging sensors 502. Specifically, the control module 508 can process light intensity data embedded in the image data and use image processing techniques to determine exposure. Depending on a determination of whether an image is over or under exposed, the control module 508 can output a control signal to the actuators 510 to adjust height of a graduated neutral density filters or switch in different neutral density filters. In some embodiments, the control module 508 can be configured to select an optimal neutral density filter based on image quality metrics. For example, the control module 508, using one or more image processing techniques, can determine angle of incident, and hue, saturation, and value from the image data. This image data can then be compared with a known good image data. Based on these image quality metrics, the control module 508 can output a control signal to the actuators 510 to adjust height of a graduated neutral density filters or switch in different neutral density filters. Further, depending on a specific implementation of this embodiment, a suitable image processing technique that is known to one of ordinary skills in the art may be employed.

In some embodiments, the control module 508 can be configured to select an optimal neutral density filter for a given lighting condition based on inputs from the ambient light sensors 504. Specifically, the control module 508 can compare current light intensity data to some threshold value stored in a memory. Depending on whether the current light intensity is greater than or less than the threshold value, the control module 508 can output a control signal to the actuators 510 to adjust height of a graduated neutral density filters or switch in different neutral density filters.

In the example of FIG. 5, the actuators 510 are intended to represent a mechanical and/or electrical component that can be configured to actuate neutral density filters to compensate for light. In some embodiments, the actuators 510 can be linear actuators that move graduated neutral density filters along an axis. In some embodiments, the actuators 510 can be motors that rotate to different neutral density filters. In some embodiments, the actuators 510 can pivot or switch different neutral density filters in and out.

In the example of FIG. 5, the system 500 can be operated as follows. One or more imaging sensors 502 capture image data with a given neutral density filter. The one or more imaging sensors 502 output the image data to the control module 508. The ambient light sensors 504 currently measure ambient light data. The control module 508 generates control signals, based on the image data and the ambient light data, to one or more actuators 510. The one or more actuators 510 receive the control signals and actuate the given neutral density filters such that a new given neutral density filter is positioned at a corresponding imaging sensor.

Figure 6:
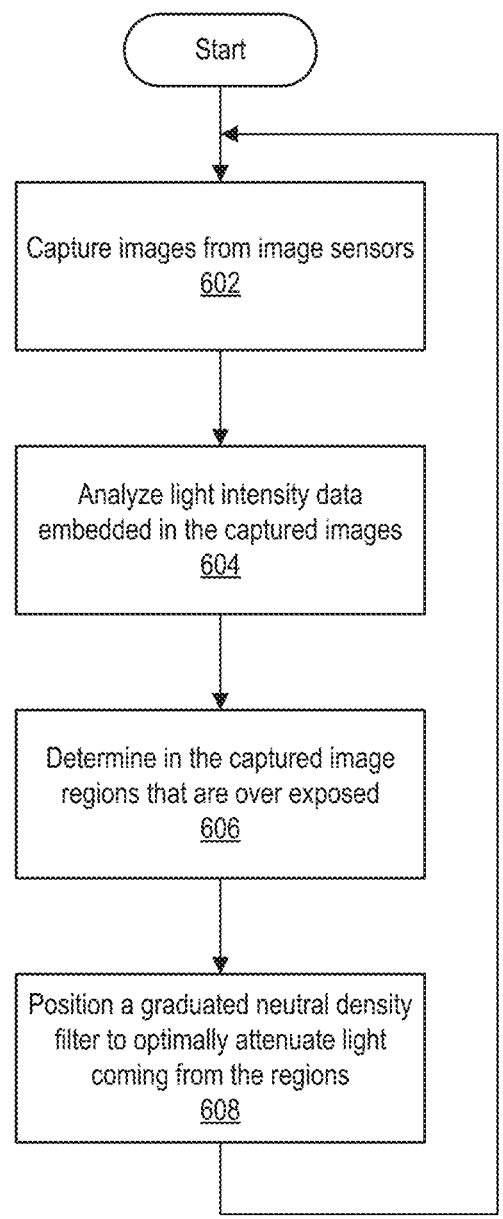
FIG. 6 is a flowchart of an example method of controlling an actuator of an adaptive neutral density filter system based on image intensity data according to an embodiment of the current disclosure.

FIG. 6 is a flowchart 600 of an example method of controlling an actuator of an adaptive neutral density filter system based on image intensity data according to an embodiment of the current disclosure. This flowchart is organized in a fashion that can be conducive to understanding. It should be recognized, however, that modules can be reorganized, reordered, modified, changed, removed, or augmented where circumstances permit. The flowchart 600 starts at module 602, in which images are captured from image sensors.

In the example of FIG. 6, the flowchart 600 continues to module 604, in which light intensity data embedded in the captured images are analyzed using one or more image processing techniques.

In the example of FIG. 6, the flowchart 600 continues to module 606, in which regions that are over exposed in the captured images are determined using one or more image processing techniques.

In the example of FIG. 6, the flowchart 600 continues to module 608, in which a graduated neutral density filter is positioned to optimally attenuate light coming from the regions that are over exposed. At this point, the flowcharts continues back to module 602, in which new images are captured and analyzed.

Figure 7:
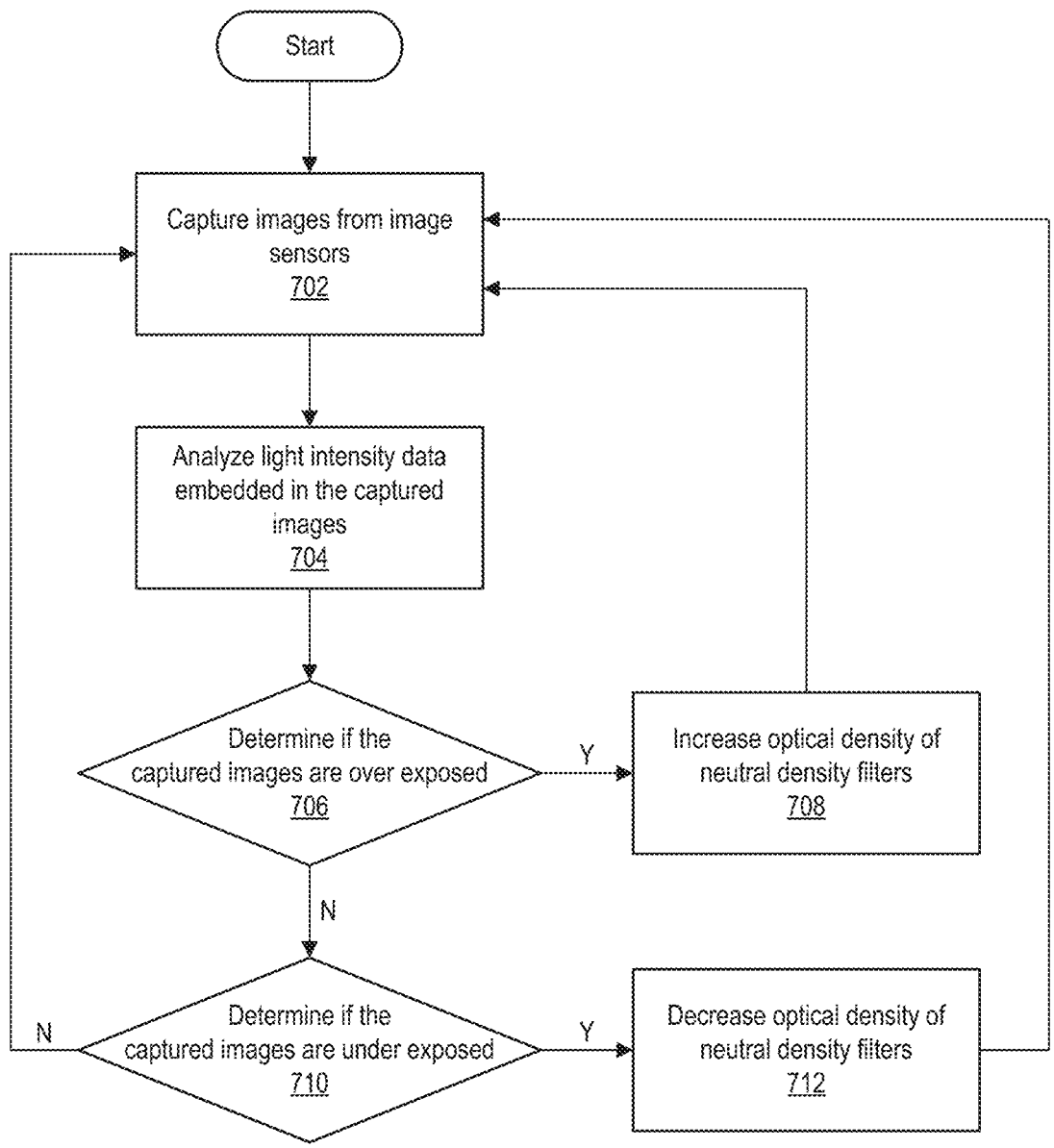
FIG. 7 is a flowchart of an example method of controlling an actuator of an adaptive neutral density filter system based on image intensity data according to an embodiment of the current disclosure.

FIG. 7 is a flowchart 700 of an example method of controlling an actuator of an adaptive neutral density filter system based on image intensity data according to an embodiment of the current disclosure. This flowchart is organized in a fashion that can be conducive to understanding. It should be recognized, however, that modules can be reorganized, reordered, modified, changed, removed, or augmented where circumstances permit. The flowchart 700 starts at module 702, in which images are captured from image sensors.

In the example of FIG. 7, the flowchart 700 continues to module 704, in which light intensity data embedded in the captured images are analyzed using one or more image processing techniques.

In the example of FIG. 7, the flowchart 700 continues to decision point 706, in which it is determined if the captured images are over exposed. If the captured images are over exposed, the flowchart 700 continues to module 708. If the captured images are not over exposed, the flowchart 700 continues to decision point 710.

In the example of FIG. 7, the flowchart 700 continues to module 708, in which optical density of neutral density filters are increased. At this point, the flowcharts continues back to module 702, in which new images are captured and analyzed.

In the example of FIG. 7, the flowchart 700 continues to decision point 710, in which it is determined if the captured images are under exposed. If the captured images are under exposed, the flowchart 700 continues to module 712. If the captured images are not under exposed, the flowchart 700 continues back to module 702, in which new images are captured and analyzed.

In the example of FIG. 7, the flowchart 700 continues to module 712, in which optical density of neutral density filters are decreased. At this point, the flowcharts continues back to module 702, in which new images are captured and analyzed.

Figure 8:
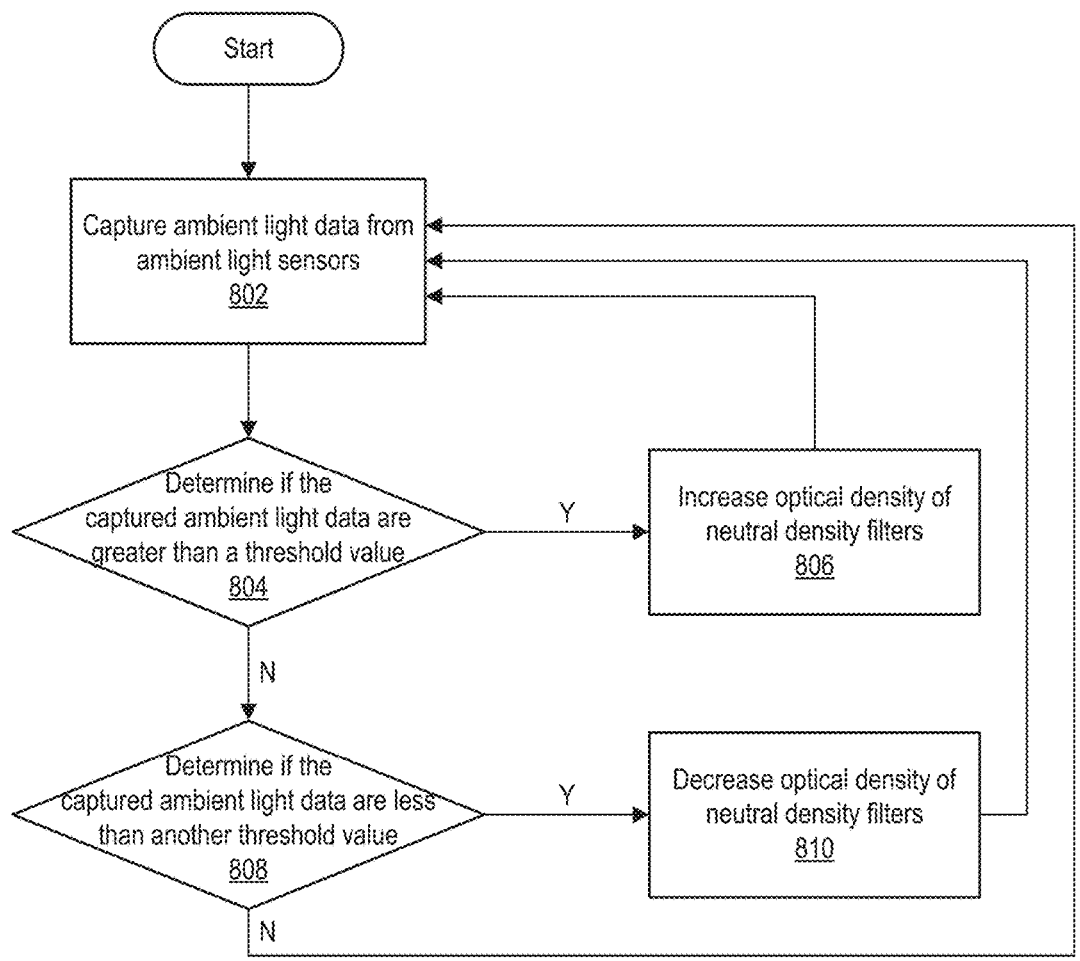
FIG. 8 is a flowchart of an example method of controlling an actuator of an adaptive neutral density filter system based on ambient data according to an embodiment of the current disclosure.

FIG. 8 is a flowchart 800 of an example method of controlling an actuator of an adaptive neutral density filter system based on ambient data according to an embodiment of the current disclosure. This flowchart is organized in a fashion that is conducive to understanding. It should be recognized, however, that modules can be reorganized, reordered, modified, changed, removed, or augmented where circumstances permit. The flowchart 800 starts at module 802, in which ambient light data are captured from ambient light sensors.

In the example of FIG. 8, the flowchart 800 continues to decision point 804, in which the captured ambient light intensity data are compared with a threshold value. If the captured ambient light intensity data are greater than the threshold value, the flowchart 800 continues to module 806. If the captured ambient light intensity data are less than the threshold value, the flowchart 800 continues to decision point 808.

In the example of FIG. 8, the flowchart 800 continues to module 806, in which optical density of neutral density filters are increased. At this point, the flowcharts continues back to module 802, in which new ambient light data are captured and analyzed.

In the example of FIG. 8, the flowchart 800 continues to decision point 808, in which the captured ambient light intensity data are compared with another threshold value. If the captured ambient light intensity data are less than the another threshold value, the flowchart 800 continues to module 810. If the captured ambient light intensity data are greater than the another threshold value, the flowchart 800 continues back to module 802, in which new ambient light data are captured and analyzed.

In the example of FIG. 8, the flowchart 800 continues to module 810, in which optical density of neutral density filters are decreased. At this point, the flowcharts continues back to module 802, in which new ambient light data are captured and analyzed.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An adaptive filter system, comprising:
a first filter having a first optical density and a second filter having a second optical density arranged serially along a common axis, each of the first filter and the second filter being adapted to attenuate incoming light incident on an imaging device;
at least one actuator coupled to the first filter and the second filter, wherein the at least one actuator is adapted to:
move the first filter to a first position in which the incoming light is attenuated at a first transmittance corresponding to the first optical density;
move the second filter to a second position in which the incoming light is attenuated at a second transmittance corresponding to the second optical density; and
move the first filter to a third position in which no portion of the first filter attenuates the incoming light or move the second filter to a fourth position in which no portion of the second filter attenuates the incoming light;
a plurality of arms coupled to the at least one actuator, the plurality of arms comprising a first arm mechanically coupled to the first filter and a second arm mechanically coupled to the second filter; and
a controller configured to control the at least one actuator responsive, at least in part, to an amount of the incoming light incident on the imaging device.

2. The adaptive filter system of claim 1, wherein the at least one actuator is adapted to move the first filter to the third position prior to, at least partially concurrently with, or after moving the second filter to the second position.

3. The adaptive filter system of claim 1, wherein the at least one actuator is adapted to move the second filter to the fourth position prior to, at least partially concurrently with, or after moving the first filter to the first position.

4. The adaptive filter system of claim 1, wherein the at least one actuator is adapted to rotate the first arm between a first deployed position and a first storing position and rotate the second arm between a second deployed position and a second storing position, wherein the first deployed position corresponds to the first filter being in the first position and the first storing position corresponds to the first filter being in the third position, and wherein the second deployed position corresponds to the second filter being in the second position and the second storing position corresponds to the second filter being in the fourth position.

5. The adaptive filter system of claim 4, wherein the first filter superimposes an aperture of the imaging device when the first arm is in the deployed position and the first filter is in the first position, and wherein the second filter superimposes the aperture of the imaging device when the second arm is in the deployed position and the second filter is in the second position.

6. The adaptive filter system of claim 1, wherein the second optical density is greater than the first optical density, and wherein the controller is further configured to:
determine that the amount of the incident light on the imaging device has increased from a first amount of incident light to a second amount of incident light;
control the at least one actuator to move the second filter to the second position; and
control the at least one actuator to move the first filter to the third position.

7. The adaptive filter system of claim 6, further comprising a third filter having a third optical density that is greater than the first optical density and less than the second optical density, and wherein the controller is further configured to:
determine that the amount of the incident light on the imaging device has decreased from the second amount of incident light to a third amount of incident light, wherein the third amount of incident light is greater than the first amount of incident light;
control the at least one actuator to move the second filter to the fourth position; and
control the at least one actuator to move the third filter to a fifth position in which the incoming light is attenuated at a third transmittance corresponding to the third optical density, wherein the third transmittance is less than the first transmittance and greater than the second transmittance.

8. The adaptive filter system of claim 1, wherein the common axis is a single rotational axis of the at least one actuator.

9. A method for performing adaptive light filtering, the method comprising:
capturing, by an imaging device, image data;
determining exposure information associated with the image data, the exposure information indicative of an amount of incoming light incident on the imaging device;
controlling at least one actuator to move one of a first filter or a second filter to one of a first position or a second position, respectively, for attenuating the amount of the incoming light on the imaging device;
controlling the at least one actuator to move the first filter to a third position in which no portion of the first filter attenuates the incoming light or move the second filter to a fourth position in which no portion of the second filter attenuates the incoming light,
wherein the at least one actuator is mechanically coupled to the first filter via a first arm, and wherein controlling the at least one actuator to move the first filter to the first position comprises controlling the at least one actuator to rotate the first arm from a first storing position to a first deployed position, wherein the first filter is in the third position when the first arm is in the first storing position and the first filter is in the first position when the first arm is in the first deployed position,
wherein the first filter has a first optical density and the second filter has a second optical density,
wherein the first filter and the second filter are arranged serially along a common axis, and
wherein the incoming light is attenuated at a first transmittance corresponding to the first optical density when the first filter is in the first position and the incoming light is attenuated at a second transmittance corresponding to the second optical density when the second filter is in the second position.

10. The method of claim 9, wherein the controlling of the at least one actuator comprises controlling the at least one actuator to move the first filter to the third position comprises controlling the at least one actuator to move the first filter to the third position prior to, at least partially concurrently with, or after controlling the at least one actuator to move the second filter to the second position.

11. The method of claim 9, wherein the first filter superimposes an aperture of the imaging device when the first arm is in the deployed position and the first filter is in the first position.

12. The method of claim 9, wherein the at least one actuator is mechanically coupled to the second filter via a second arm, and wherein controlling the at least one actuator to move the second filter to the second position comprises controlling the at least one actuator to rotate the second arm from a second storing position to a second deployed position, wherein the second filter is in the second position when the second arm is in the second deployed position.

13. The method of claim 12, wherein controlling the at least one actuator to move the first filter to the third position comprises controlling the at least one actuator to rotate the first arm from the first deployed position to the first storing position.

14. The method of claim 9, wherein the common axis is a single rotational axis of the at least one actuator.

* * * * *